United States Patent
Kenzior et al.

(10) Patent No.: US 9,432,489 B2
(45) Date of Patent: Aug. 30, 2016

(54) SYSTEMS AND METHODS FOR PROCESSING ENCODED DATA STREAMS

(75) Inventors: Denis Kenzior, Manchaca, TX (US); Marcel Holtmann, Kirchlengern (DE)

(73) Assignee: INTEL CORPORATION, Santa Clara, CA (US)

( * ) Notice: Subject to any disclaimer, the term of this patent is extended or adjusted under 35 U.S.C. 154(b) by 425 days.

(21) Appl. No.: 13/488,887

(22) Filed: Jun. 5, 2012

(65) Prior Publication Data

US 2013/0326080 A1   Dec. 5, 2013

(51) Int. Cl.
| | |
|---|---|
| *H04W 80/00* | (2009.01) |
| *G06F 15/16* | (2006.01) |
| *H04L 29/06* | (2006.01) |
| *G06F 17/22* | (2006.01) |
| *H04W 80/12* | (2009.01) |

(52) U.S. Cl.
CPC ........... *H04L 69/22* (2013.01); *G06F 17/2252* (2013.01); *H04L 29/06* (2013.01); *H04W 80/12* (2013.01)

(58) Field of Classification Search
CPC ..... H04W 80/00; H04W 80/12; G06F 15/16; G06F 17/2252; G06F 2212/401; H04L 63/20; H04L 69/22; H04L 69/04; H04L 29/06; H04N 19/176; H04N 19/423; H03M 7/30
USPC ........ 713/153, 201; 709/246, 217, 204, 231, 709/212, 213; 370/401; 726/1, 29; 455/411, 455/412.1; 341/50, 51
See application file for complete search history.

(56) References Cited

U.S. PATENT DOCUMENTS

| | | | |
|---|---|---|---|
| 4,464,650 A * | 8/1984 | Eastman | H03M 7/3088 341/51 |
| 5,442,708 A | 8/1995 | Adams, Jr. et al. | |
| 6,311,058 B1 * | 10/2001 | Wecker | G06F 17/211 455/412.1 |
| 7,016,360 B1 * | 3/2006 | Dong | 370/401 |
| 7,403,974 B1 * | 7/2008 | Harris | 709/213 |
| 2001/0005884 A1* | 6/2001 | Serada | 713/153 |
| 2002/0062397 A1* | 5/2002 | Chang et al. | 709/246 |
| 2003/0006919 A1* | 1/2003 | Collins et al. | 341/87 |

(Continued)

FOREIGN PATENT DOCUMENTS

WO    2013/184328 A1    12/2013

OTHER PUBLICATIONS

Wireless Application Protocol Wireless Session Protocol Specification, Jul. 2001, Wireless Application Protocol Forum, Ltd., Approved Version Jul. 5, 2001.*

(Continued)

*Primary Examiner* — Oleg Survillo
*Assistant Examiner* — Schquita Goodwin
(74) *Attorney, Agent, or Firm* — Stoel Rives LLP

(57) ABSTRACT

A method and system for efficient processing of encoded data streams communicated through a wireless network are disclosed. A system may include a receiver component, an iterator component, and a return component. The receiver component receives an encoded message including a plurality of objects. The message may be encoded according to a protocol. The iterator component traverses, without decoding the encoded message, the plurality of objects within the encoded message to locate a selected object of the plurality of objects. The selected object is selected by a client application. The return component returns data associated with the selected object to the client application.

19 Claims, 4 Drawing Sheets

(56) References Cited

U.S. PATENT DOCUMENTS

| | | | |
|---|---|---|---|
| 2003/0084178 A1* | 5/2003 | Simpson et al. | 709/231 |
| 2003/0088792 A1* | 5/2003 | Card et al. | 713/201 |
| 2003/0217132 A1 | 11/2003 | Batten et al. | |
| 2005/0120091 A1* | 6/2005 | Casais | H04L 29/06 709/217 |
| 2005/0193427 A1* | 9/2005 | John | 726/1 |
| 2007/0008191 A1* | 1/2007 | Archbold | H03M 7/30 341/50 |
| 2007/0191032 A1 | 8/2007 | Doffman | |
| 2008/0134347 A1* | 6/2008 | Goyal et al. | 726/29 |
| 2010/0146068 A1* | 6/2010 | Haviv | 709/212 |
| 2010/0223331 A1* | 9/2010 | Brown et al. | 709/204 |
| 2010/0318782 A1 | 12/2010 | Auradkar et al. | |
| 2011/0269424 A1* | 11/2011 | Multer et al. | 455/411 |

OTHER PUBLICATIONS

SweetScape Software, 010 Editor, 2002-2013 SweetScape Software Inc, http://www.sweetscape.com/articles/hex_editor.html.*

Baldur's Gate, The Computer Show—HEX Codes.*

CNET, "Open ZIP files on iOS with WinZip," Feb. 2012, pp. 1-5.*

International search Report and written Opinion received for PCT Application No. PCT/US2013/041585, mailed on Aug. 23, 2013, 11 pages.

Leclair, "WinZip iPhone Application the Easiest Way to View Compressed Files on Your iPhone", http://www.makeuseof.com/tag/author/dleclair/, Mar. 3, 2012, 5 pages.

* cited by examiner

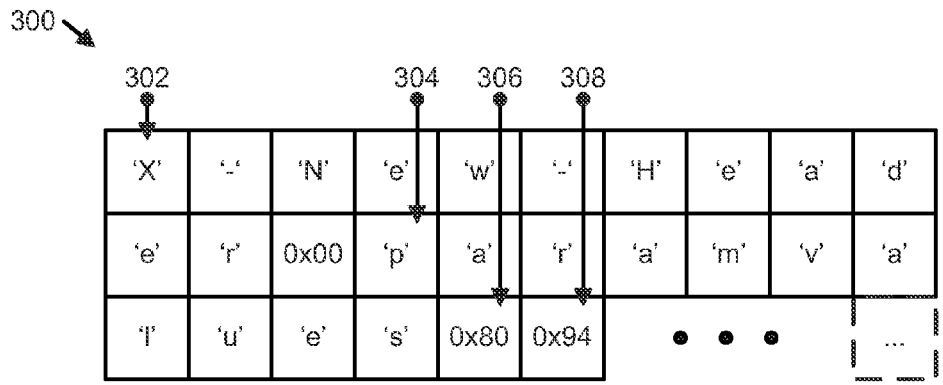
FIG. 3
400
iter_init(...)
iter_next(...)
return_header()  ;; *returns pointer to "X-New-Header"*
return_param()  ;; *returns pointer to "paramvalues"*
iter_next(...)
return_header()  ;; *returns pointer to "Accept"*
return_param()  ;; *returns pointer to ""application/vnd.wap.wmlc"*
FIG. 4
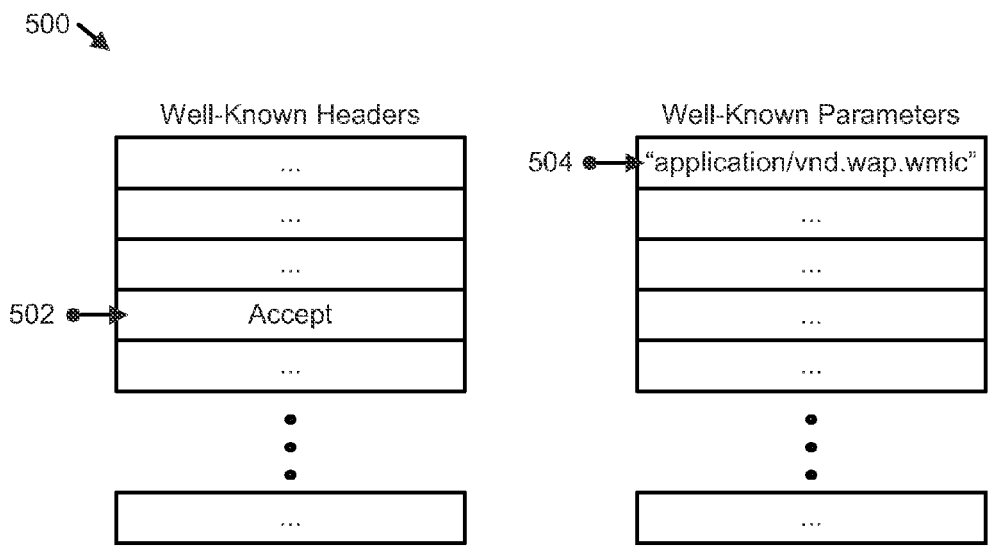
FIG. 5

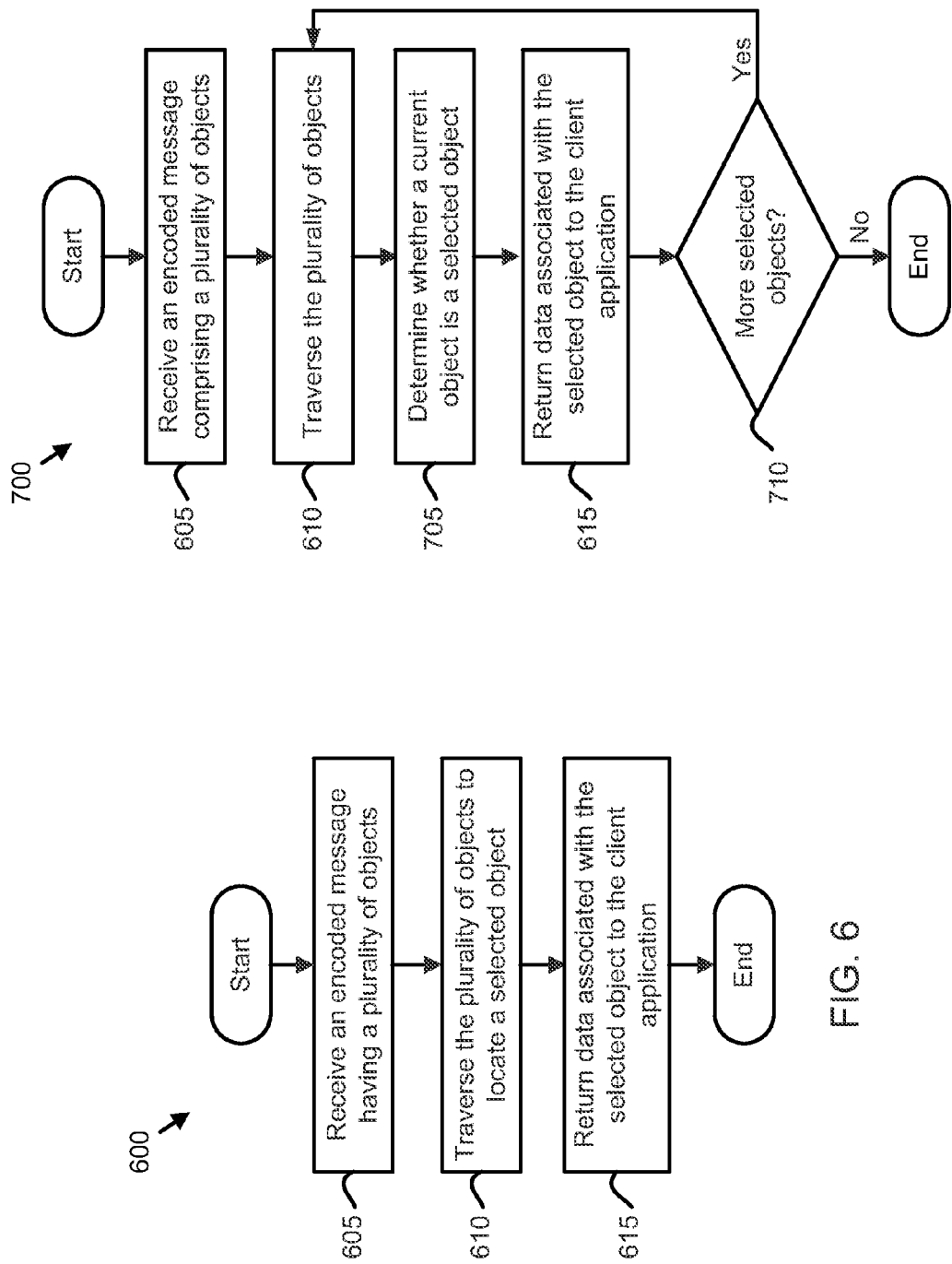

SYSTEMS AND METHODS FOR PROCESSING ENCODED DATA STREAMS

TECHNICAL FIELD

This disclosure relates to systems and methods for communication between devices over a network. Specifically, this disclosure relates to systems and methods for efficient processing of encoded messages sent over a communications network.

BACKGROUND

Devices generally use encoded messages to communicate data streams over a network. The encoded messages may include compressed data intended for certain client applications. Upon receiving a message through a network, a device may uncompress the data and store it in a separate data structure used by a client application. To extract and copy the data of interest into the data structure, the device is configured to fully or partially comprehend the encoded message. Thus, the device uses extra memory overhead to store the message contents during processing.

BRIEF DESCRIPTION OF THE DRAWINGS

FIG. 3 is a block diagram representation of an example encoded message consistent with embodiments disclosed herein.

FIG. 4 illustrates example pseudo-code for processing an encoded message consistent with embodiments disclosed herein.

FIG. 5 is a block diagram of an example library consistent with embodiments disclosed herein.

FIG. 6 is a flow chart of a method for efficient processing of an encoded message consistent with embodiments disclosed herein.

FIG. 7 is a flow chart of another method for efficient processing of an encoded message consistent with embodiments disclosed herein.

DETAILED DESCRIPTION

Figure 1:
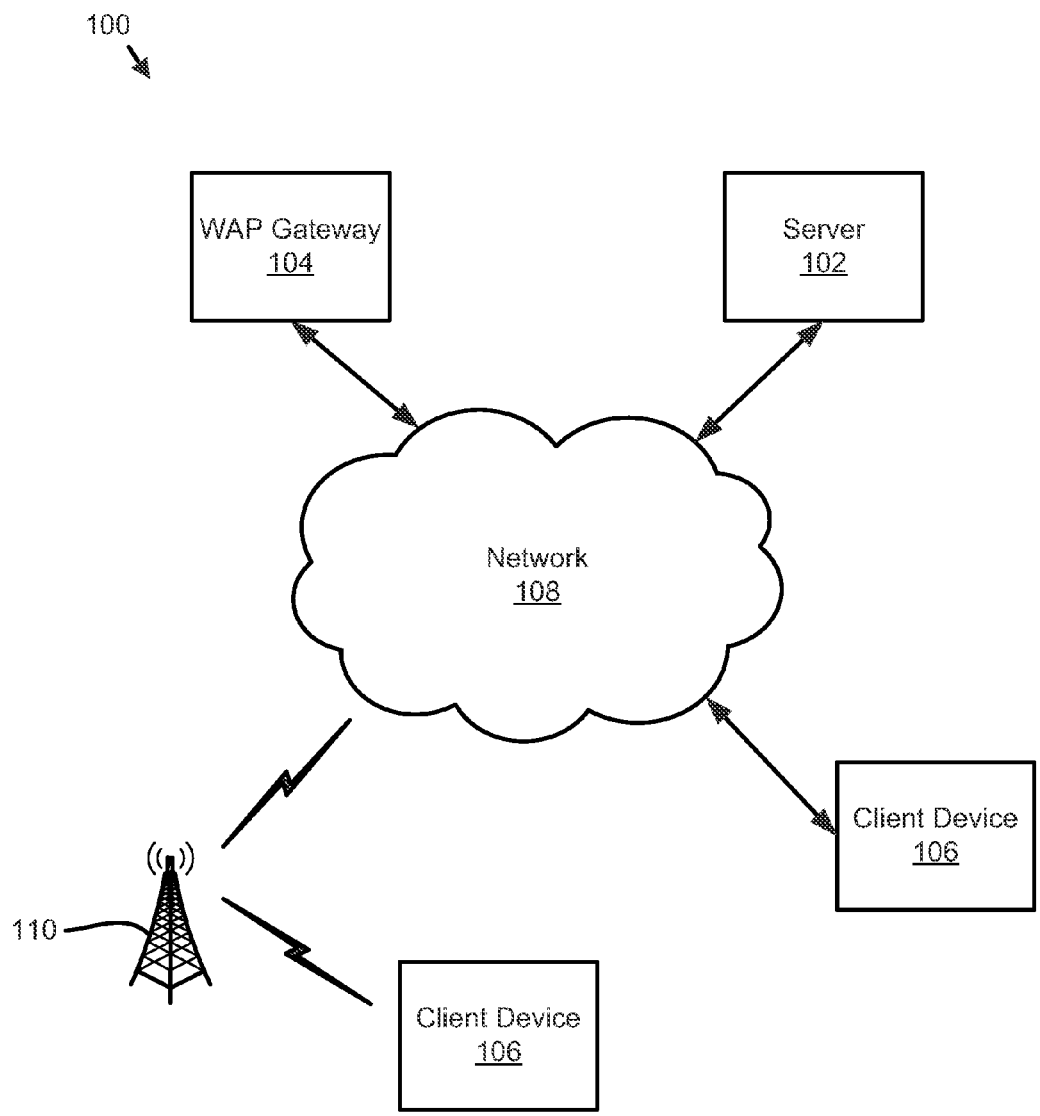
FIG. 1 is a block diagram illustrating a system for efficient processing of an encoded message consistent with embodiments disclosed herein.

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Systems and methods disclosed herein may perform zero-copy processing of encoded data streams without the additional memory overhead of traditional processing schemes. In certain embodiments, an "iterator" efficiently traverses encoded messages with reduced or minimal storage overhead and no memory allocation and/or copy overhead. The iterator may return pointers associated with objects within an encoded message received through a network. For example, when the iterator encounters predetermined (e.g., well-known within the communication protocol) parameters or tokens in the message, the iterator may return a pointer to local, static, and read only memory locations where data (e.g., strings) associated with the predetermined parameters or tokens are stored. When the iterator encounters an application-specific value in the encoded message, the iterator may return a pointer to a memory location at a corresponding offset in the received data stream.

For illustrative purposes, certain embodiments disclosed herein use the wireless application protocol (WAP) and the wireless session protocol (WSP). Those skilled in the art will recognize from the disclosure herein, however, that the disclosure is not so limited and that the disclosure may be applied to other protocols that allow the interoperability of communication devices. WAP is an open international standard used by many mobile devices for communication and is guided by the Open Mobile Alliance (OMA) organization. A technical description and specification of WAP and WSP is available through the OMA. The WAP standard describes a suite of protocols allowing the interoperability of WAP based applications and equipment with different network technologies such as IS-95 also known as code division multiple access (CDMA), worldwide interoperability for microwave access (WiMAX), Bluetooth, global system for mobile communications (GSM), universal mobile telecommunications system (UMTS), long term evolution (LTE), and the like. The WSP standard in particular is used by a WAP browser and multimedia messaging service (MMS). Many services, including mobile device management (MDM) and digital rights management (DRM) rely on data push facilities provided by the WSP specification.

One method of communication between two WAP enabled applications includes sending a message encoded in WSP. The encoding process involves compression of certain portions of a message into a binary form, which is accomplished by encoding well-known objects (such as headers, header parameters, or other values) into shorter, or compressed, binary forms. Generally, the messages are then sent and received by another device or application. Upon receipt, the messages are decoded/decompressed into a separate data structure representing the message that may then be interpreted by an application on the client device. Generally, this requires a client application or client device to fully comprehend the message so as to extract and copy the information into a separate data structure.

Frequently, the WSP decoding routines are part of the middle-ware or core system level application programming interfaces (APIs) and are re-used by most or all WSP-enabled applications. Due to this nature, the APIs are generally required to be complete implementations of the WSP protocol. This means that all message contents are processed and comprehended during the decoding phase and may be repeated each time a message is passed to a new application within a device. This requires extra memory overhead to store the message contents during processing. This can be detrimental to many mobile devices or embedded systems that have limited memory and/or limited battery. Furthermore, for services like MMS that are built on top of WSP to exchange audio and video content, the additional memory overhead can be quite expensive because of the copying and storage of the large portions of data represented by the audio and video content. In addition, there are often situations where full comprehension of the message is not required. For example, some applications may only need a small portion of the data that is within a WSP encoded message. Thus, the full comprehension and the associated CPU, memory, battery and power usage involved in the decoding process can lead to significant inefficiencies.

Thus, the systems and methods disclosed herein provide efficient processing of encoded message. In one embodiment, efficient processing includes performing zero-copy processing of WSP data streams and encoded messages without the overhead of traditional schemes. In one embodiment, a client device uses certain structural aspects of the WSP encoding standard to traverse an encoded message to locate a selected object that is of interest to the client device or to a client application. The client device may then return data associated with the selected object to a client program. The client program may use or process the data as needed. Traversal of the encoded message and only providing data that is of interest may allow processing of a message in an encoded state and can limit the need to create a decoded or decompressed version of the message. Furthermore, portions of an encoded message that are irrelevant may be ignored and only portions relevant to a client program are comprehended, copied, and/or processed. Corresponding CPU, memory, and battery savings may result.

In one embodiment, the traversal is accomplished by using an iterator component that is able to efficiently traverse WSP encoded messages with minimal storage overhead, little or no memory allocation/copy overhead, and little or no CPU overhead. For example, the iterator component may traverse over individual objects (such as headers and/or header parameters) of the WSP encoded message. In one embodiment, the iterator component may locate a next object and an application or other component may determine whether that object is of interest to a client application. If the object is of interest, associated data may be provided to the client application. In some situations a pointer to the data or to a separate library may be provided, rather than copying data from the message. Usage of stack based memory locations enables support for compilation time compression and optimized lookups. This may allow WSP-enabled clients, such as client applications, to use the iterator and only process information objects that are relevant to the particular application.

Using efficient traversal of an encoded message, applications that do not need to process or comprehend everything in a message can skip over objects that are irrelevant. One example of a client application that may not need to process and/or comprehend a full message may include a dispatcher application. As mentioned above, WSP provides a mechanism for data push. A dispatcher application may receive all WAP push messages received by a client device. The dispatcher application may be responsible for dispatching the WAP push message to the intended client application on the system. For example, WAP push messages may be intended for an OMA device management (OMA DM) or OMA client provisioning (OMA CP) based device management application, an OMA DRM based digital rights management application, a vCard contacts application, or the like. Many applications may be intended recipients because many network operator specific applications and services also use WAP push.

In order to determine the recipient without efficient traversal, the dispatcher application may parse the WSP encoded message to determine its multi-purpose internet mail extension (MIME) type. With some methods, this may require complete decoding and copying of the whole message. However, based on embodiments disclosed herein, an iterator component can efficiently traverse the message to locate an object that designates MIME type, process that information, and forward the message on to the intended recipient application. This can improve efficiency because the dispatcher application does not require (and may not even be capable of using) any information except for the MIME type. Because the dispatcher application only obtains needed information and ignores other information, latency and overhead can be significantly reduced.

Using an iterator component also allows WSP encoded messages to be stored in an encoded format. This may limit the amount of copying required to decode or use the data within the encoded message. Furthermore, because encoded messages are often smaller than decoded messages, memory usage on the device may be decreased. In addition, or in other embodiments, multiple applications or components may access the encoded message concurrently. Thus one application may read images or other data from the message while another application reads audio or other data during the same time period. Similarly, because an encoded message can be efficiently traversed, messages that include data that is not currently understood by any client application can be stored until such an application is identified and installed. Furthermore, when large amounts of payload or other data are included in an encoded message, this data may be skipped, leading to significant memory allocation and processor usage savings over other methods.

FIG. 1 is a block diagram illustrating a system 100 for efficient processing of an encoded message according to one embodiment. The system 100 includes a server 102, a WAP gateway 104, and client devices 106 (two shown). The components 102, 104, 106 of the system 100 may communicate over a network 108. In one embodiment, for example, a client device 106 may communicate over the network 108 using a wired or wireless connection. For wireless communication, an antenna 110 may be used to provide the client device 106 a wireless connection through the network 108 to other components 102, 104, 106 of the system 100.

The server 102 may include any type of hardware and/or software known in the art. The server 102 may provide data, information, or other content to the WAP gateway 104 or client devices 106. In one embodiment, the server 102 may be a web server providing website content. For example, web pages, video, audio, multimedia, text, or the like may be provided by the server 102 to one or more of the WAP gateway 104 or the client devices 106. In another embodiment, the server 102 may be a communications server which forwards data received from another server or device to a component of the system 100. For example, voice communications, messages, or other data may be forwarded by the server 102 from another server, device, or component of the system 100 to a component of the system 100.

The server 102 may use any type of communication protocol known in the art. Example protocols include internet protocol (IP), hypertext transfer protocol (HTTP), file transfer protocol (FTP), internet message access protocol (IMAP), WAP, or the like. Numerous other types of communication protocols are well-known and well-defined in the art.

One of skill in the art will recognize the variations and functionality of WAP gateways currently available in the art. In one embodiment, the WAP gateway 104 translates content from one protocol or format to one of the protocols or formats as defined by the WAP. For example, the WAP gateway 104 may take content encoded in HTTP and translate it into wireless markup language (WML), which can be interpreted and/or processed by a mobile device or other WML capable device or software. In one embodiment, the WAP gateway 104 may be situated between the network 108 and the client devices 106.

In one embodiment, the WAP gateway 104 may receive content from the server 102 or other device encoded in a first language or protocol and translate the content into formats compatible with WAP. Thus, devices that are capable of WAP communication may be able to access content that was initially designed or encoded for other devices or protocols. In one embodiment, the WAP gateway 104 formats a message or other data unit for a client device 106. The client device 106 may then be able to receive the message and process the message or other data unit as intended. As will be understood by one skilled in the art, other types of gateways may be used depending on a protocol or other communication requirements.

The network 108 may include any type of communications network. Example communications networks include a cable network, a mobile phone network, a satellite network, a computing network, the internet, or the like. In one embodiment, the network 108 may include a plurality of smaller networks. The network 108 may be capable of wired and/or wireless communications. In one embodiment, the network may be implemented according to one or more of a wide variety of wireless communications standards including, but not limited to, CDMA, WiMAX, Bluetooth, GSM, UMTS, LTE, and the like. In one embodiment, the network 108 is capable of communicating with the client device 106 using the antenna 110 or other wireless transmission device or system.

The system 100 depicted in FIG. 1 includes a client device 106 in wired communication with the network 108 and a client device 106 in wireless communication with the network 108 through the antenna 110. Although not shown, the antenna 110 may represent other elements of a wireless network such as a base station or femtocell. The client devices 106 may include any type of communication device or data processing device known in the art. Example client devices include, but are not limited to, a mobile phone such as a feature phone or a smart phone, a personal digital assistant (PDA), a tablet computer, a laptop computer, a desktop computer, or the like. According to one embodiment, the client device 106 may include a mobile information processing device running a mobile operating system such as MeeGo®, Android®, iOS®, Windows Phone®, or the like.

In one embodiment, the client devices 106 may be used to browse web content, send messages, and perform a variety of different types of communication or data processing. The client devices 106 may include a number of applications for performing different functions for communication, media consumption, internet browsing, or the like. In one embodiment, the client devices 106 may send to and/or receive messages from another device. For example, data received from the server 102, WAP gateway 104, or another client device 106 may be received in the form of one or more messages. In one embodiment, the client devices 106 may be configured to efficiently process encoded messages received from another device.

Figure 2:
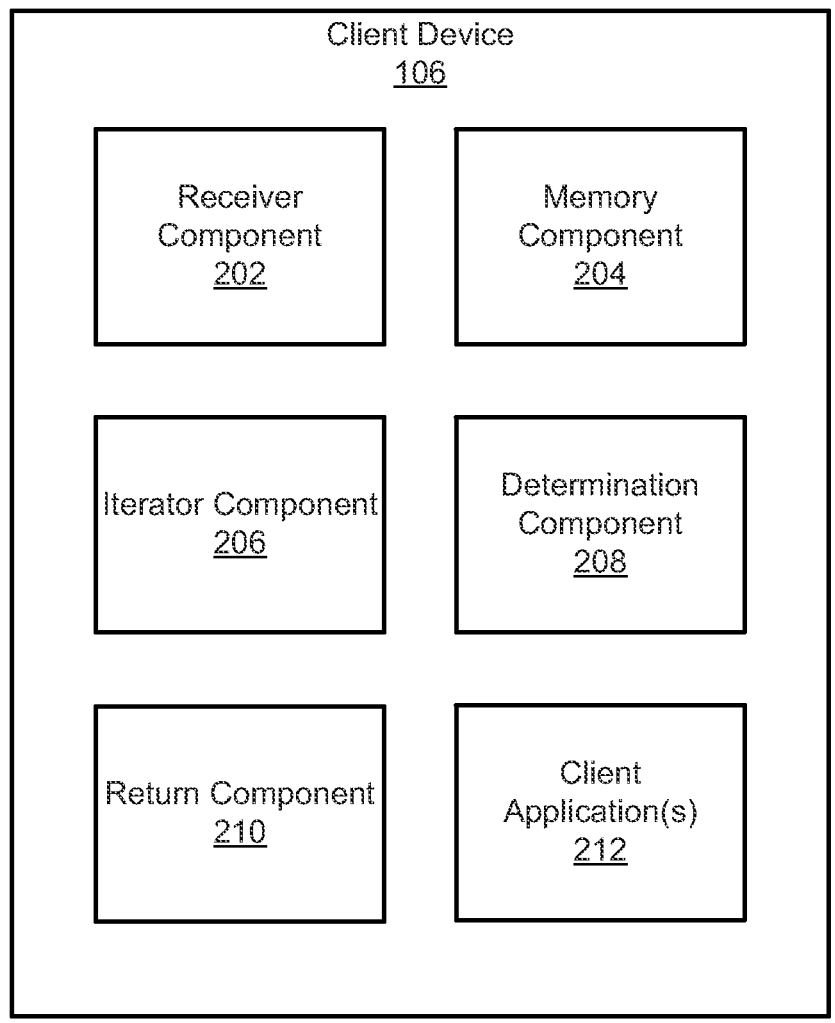
FIG. 2 is a block diagram of a client device consistent with embodiments disclosed herein.

FIG. 2 is a block diagram of a client device 106 according to one embodiment. The client device 106 is configured to efficiently process encoded messages. The client device 106 may traverse an encoded message and locate objects within the message of interest to a client program without decoding the encoded message. As used herein the term object is given to mean any unit of data within a message such as a header, a header parameter, payload data, or any other data object.

The depicted client device 106 includes a receiver component 202, a memory component 204, an iterator component 206, a determination component 208, a return component 210, and one or more client applications 212. The components 202, 204, 206, 208, 210, 212 are shown by example only and may not be included in all embodiments. For example, the client device 106 may include one or any combination of two or more of the components 202, 204, 206, 208, 210, 212 in varying embodiments.

In one embodiment, the receiver component 202 receives an encoded message. The receiver component 202 may receive the encoded message over the network 108 from another client device 106, the WAP gateway 104, the server 102, or any other device. The encoded message may be encoded according to a protocol. In one embodiment, the encoded message is encoded according to WAP standard. In one embodiment, the encoded message is encoded according to WSP.

The encoded message may include a plurality of objects. For example, the message may include one or more headers, header parameters, payloads, or other objects. In one embodiment, at least one object of the plurality of objects is encoded in a compact binary format. For example, at least a portion of an object may be encoded such that it is smaller in an encoded state than in a non-encoded state. In one embodiment, the encoded message may include one or more protocol data units (PDUs), which may be units of data that are sent over a network 108. In one embodiment, the encoded message may be a data push or a data pull message.

In one embodiment, a protocol may define one or more objects as well-known objects. For example, well-known objects may include headers, header parameters, or other data that is defined within a protocol or well-known within a protocol. The protocol may also define a compact binary encoding for each of the well-known objects. For example, this may allow for a compact and/or compressed encoding for the well-known objects to limit the size of a message or increase the amount of payload data that may be included in a message. Devices or applications that operate according to the protocol may thus be able to understand or interpret the encoded or compressed binary encoding as a corresponding well-known object. In one embodiment, the encoded message may include a compact binary encoding of a well-known object.

FIG. 3 is a block diagram representation of an example encoded message 300 according to one embodiment. The encoded message 300 may be stored in memory and/or transmitted over a wired or wireless communication medium. According to one embodiment, the encoded message 300 is encoded according to WSP. Pointers 302, 304, 306, 308 indicate locations of objects within the encoded message 300.

The encoded message 300 includes a series of values represented as bytes or bits. According to one embodiment, the encoded message 300 includes objects that represent data for processing by the client device 106 and/or the client application 112 shown in FIG. 1. Although only a small number of objects are illustrated in FIG. 3, one of skill in the art will recognize that a large number of objects may be present in some embodiments.

According to certain embodiments, an object within the message may be in a compressed or uncompressed format. The object indicated by the pointer 302 is a header having an uncompressed value of "X-New-Header". According to one embodiment, the header object at the pointer 302 is a custom object and thus is in an unencoded or uncompressed state even though the encoded message 300 is in an encoded state. For example, the value "X-New-Header" may not have a compact binary encoding defined by WSP. The object at pointer 302 is followed by a parameter object at pointer 304 having the uncompressed value of "paramvalues". Once again, the parameter object at pointer 304 is uncompressed because it is a custom value. That is, the value "paramvalues" may not have a compact binary encoding defined by WSP.

The pointer 306 points to a header object having the value "0x80" (hexadecimal 80). The header object "0x80" may be a binary encoding for a well-known header. For example, the binary encoding "0x80" may be defined by WSP as a compact encoding for the uncompressed header "Accept". The pointer 306 is followed by the pointer 308 pointing to a parameter object having the value "0x94" (hexadecimal 94). The parameter object "0x94" is a binary encoding for a well-known parameter value. For example, the binary encoding "0x94" may be defined by WSP as a compact encoding for the uncompressed parameter value "application/vnd.wap.wmlc".

The encoded message 300 is provided by way of example only. For example, other encoded messages in other embodiments may be encoded according to other protocols or standards. One of skill in the art will recognize encoded messages having considerable variation in structure, length, encoding, and the like.

Returning to FIG. 2, the memory component 204 of the client device 106 may store data for the client device 106. In one embodiment, the memory component 204 may include memory for storage of data. According to one embodiment, the memory may include read-only memory. In another embodiment, the memory may include writable memory. In one embodiment, the memory may include both read-only and writable memory. In one embodiment, the memory component 204 may store an encoded message such as the encoded message 300 of FIG. 3. The memory component 204 may store other components of the client device 106 such as code. For example, the receiver component 202, iterator component 206, determination component 208, return component 210, and/or client application(s) 212 may reside within memory of the memory component 204. The components 202, 204, 206, 208, 210, 212 or portions thereof may also be implemented as hardware, firmware, or the like. The memory component 204 may also store a library of decoded object values (see FIG. 5).

In one embodiment, the iterator component 206 traverses an encoded message to locate objects within the encoded message. In one embodiment, the iterator component 206 may interact with the determination component 208, discussed below, to locate selected objects within the encoded message. In one embodiment, the iterator component 206 may traverse an encoded message to locate a selected object. The selected object may be an object selected by another application, such as the client application 212.

In one embodiment, the iterator component 206 may traverse the encoded message to identify a next object within the encoded message. The iterator component 206 may designate the identified next object as a current object. For example, traversing the one or more objects within the encoded message may include locating a subsequent object following a current location tracked by the iterator component 206 within the encoded message. The iterator component 206 may identify objects within the encoded message based on the structure required by a protocol or other standard. For example, the iterator component 206 may traverse the encoded message 300 of FIG. 3 based on requirements imposed by the WSP standard. In one embodiment, the iterator component 206 may locate values within the encoded message that indicate the beginning of a new object, or may look for specific headers, parameters, or encoded binary values.

According to one embodiment, the iterator component 206 traverses the encoded message without decoding the encoded message. In one embodiment, the iterator component 206 may traverse the encoded message without creating an unencoded version of the encoded message. In one embodiment, the iterator component 206 may reference a library of objects as defined by a protocol without creating an unencoded version of the message and/or without creating an unencoded version of an object within the message. For example, the iterator component 206 may traverse the encoded message without creating a decoded copy of any portion of the message. In one embodiment, decoding of binary encodings may not be necessary due to a library with decoded object values.

The determination component 208 may determine whether an object identified by the iterator component 206 is a selected object. According to one embodiment, a selected object is an object that is selected by a client application 212. A selected object may be an object that is of interest to a client application 212 for processing or controlling operation of the client application 212. For example, some objects of an encoded message may not be relevant to the operation of the client application 212 while other objects are relevant. According to one embodiment, only those objects that are relevant are selected objects and the determination component 208 determines whether an object identified by the iterator component 206 is a selected object.

According to one embodiment, the determination component 208 compares an object with one or more selected objects that correspond to a client application 212. For example, the client application 212 may provide a list of selected objects which, if found in an encoded message, should be provided to the client application 212. In one embodiment, the determination component 208 compares an object with the list of selected objects. If the object corresponds to an object in the list of selected objects the determination component 208 may determine that the object is a selected object.

According to one embodiment, the determination component 208 compares the value of an object with values within a list of selected objects. For example, if the value of an object identified by the iterator component 206 matches a value within a list of selected objects, the determination component 208 may determine that the object is a selected object. According to another embodiment, the determination component 208 may locate a value in a library that corresponds to an object identified by the iterator component 206. For example, if the object identified by the iterator component 206 is a compact binary encoding, the determination component 208 may locate a value in a library that corresponds to the compact binary encoding. The value in the library may then be compared with the values in a list of selected objects.

The return component 210 returns data associated with a selected object. In one embodiment, the return component 210 may return the data to a client application 212. According to one embodiment, the data may be returned in response to the iterator component 206 and determination component 208 locating a selected object. In one embodiment, the return component 210 may return data in response to the determination component 208 determining that an object identified by the iterator component 206 is a selected object.

In one embodiment, the return component 210 may return the value of an object. In another embodiment, the return component 210 may return a pointer to data associated with the object. In one embodiment, a pointer may point to a location within an encoded message where an object is located. In another embodiment, a pointer may point to a location within a library that has a value corresponding to an object within the message. For example, a selected object may correspond to a well-known object as defined by a protocol and a pointer may point to a predetermined memory location in a library where an un-encoded version of the well-known object is stored.

The one or more client applications 212 may include any application that may run on the client device 106. According to one embodiment, the client application 212 may be an application that uses data received through network messages such as a web browser, an audio player, a video player, an image viewer, a messaging application, or any other application. In one embodiment, a client application 212 may include a dispatcher application which processes incoming messages and notifies an intended recipient application of the receipt of the message. Other example applications include a text messaging application, a multimedia messaging application, and the like.

Turning to FIGS. 3, 4, and 5, illustrate example interaction between components 202, 204, 206, 208, 210, 212 of the client device 116 to process an encoded message. As stated previously, FIG. 3 illustrates a block diagram of an example encoded message. FIG. 4 illustrates example pseudo-code 400 for processing an encoded message according to one embodiment. FIG. 5 is a block diagram of an example library 500 according to one embodiment. The library 500 includes well-known headers and well-known parameters. Pointers 502 and 504 are illustrated pointing to values within the library. In one embodiment, the library 500 may include read only values which may not be modified by client applications. The library 500 may be read only due to the type of memory in which the library 500 is stored or may be read-only memory as managed by an operating system or other memory management application or component. In one embodiment, the library 500 may be used as a look-up table for interpreting encoded binary values.

The pseudo-code 400 of FIG. 4 includes an "iter_init( . . . )" instruction which may be used to initialize the iterator component 206. In one embodiment, the iterator component 206 may be initialized with a memory address of the encoded message 300 of FIG. 3.

The "iter_next( . . . )" instruction may cause the iterator component 206 and determination component 208 to work together to locate a next selected object within the encoded message 300. In this example, the "iter_next( . . . )" instruction may result in the iterator component 206 locating an object at the location of the pointer 302 within the encoded message 300. The iterator component 206 may keep track of the memory location of the object by storing the pointer 302 as a pointer to a current object. For example, the iterator component 206 may store a memory location value corresponding to a location pointed to by the pointer 302. In another embodiment, the "iter_next( . . . )" instruction may result in the iterator component 206 skipping over the object at the pointer 302 to the object at the pointer 306. For example, if "X-New-Header" is not a selected object for a client application, the "iter_next( . . . )" instruction may skip over that object.

The "return_header( )" instruction causes the return component 210 to return a pointer to the header value at the location of the current pointer tracked by the iterator component 206. For example, assuming that the object at the pointer 302 is a selected object, the pointer 302 which points to "X-New-Header" is returned. The "return_param( )" instruction returns a pointer to the parameter value following the header at the location of the current pointer tracked by the iterator component 206. For example, the pointer 304 which points to "paramvalues" is returned.

The "iter_next( . . . )" instruction causes the iterator component 206 to locate a next selected object within the encoded message 300. In this example, the selected object is located at the pointer 306. According to one embodiment, the "return_header( )" and "return_param( )" return pointers to locations within the encoded message. For example, "return_header ( )" instruction may return the pointer 306 and the "return_param( )" may return pointer 308. According to another embodiment, the "return_header ( )" and "return_param( )" return pointers to memory locations within a library. For example, "return_header ( )" instruction may return the pointer 502 within the library 500 and the "return_param( )" may return the pointer 504 within the library 500. For example, the value "0x80" within the encoded message 300 may be an encoded binary value that corresponds to "Accept" within WSP and the value "0x94" may be an encoded binary value that corresponds to "application/vnd.wap.wmlc" in WSP.

In one embodiment, the "iter_next( . . . )", "return_header( )", and "return_param( )" instructions may be repeated until the encoded message 300 has been traversed and all selected objects have been located. For example, code to create a loop that causes the instructions to be executed until all selected objects have been located may be used, in some embodiments.

FIG. 6 is a flow chart of a method 600 for efficient processing of an encoded message according to one embodiment. The method 600 may be performed, for example, by the client device 106 shown in FIG. 2 and/or the system 100 shown in FIG. 1. It should be noted that, in at least some embodiments, any of the functionality or features discussed in relation to the system 100 or client device 106 may be included within the method 600.

The method 600 begins and the receiver component 202 receives 605 an encoded message. The encoded message may be received 605 from a network such as a wireless communications network or other network. The encoded message may be encoded according to a protocol. In one embodiment, the encoded message is encoded according to WSP. In one embodiment, the encoded message includes a plurality of objects. The plurality of objects may include headers, parameters, or other values.

The method 600 includes an iterator component 206 traversing 610 the plurality of objects of the encoded message to locate a selected object. In one embodiment, the encoded message is not decoded during traversal 610. The iterator component 206 may locate the selected object based on structural requirements of a protocol. For example, an encoded message encoded according to WSP may have specific structures required by WSP. In one embodiment, the iterator component 206 traverses 610 the encoded message to locate objects or structures defined by WSP. The selected object may be an object selected by a client application. For example, a client application may have an associated list of one or more objects to be located by the iterator component 206. Objects that are on the list may be selected objects.

The method 600 includes a return component 210 returning 615 data associated with the selected object. In one embodiment, the associated data is returned 615 to a client application. The return component 210 may return 615 the associated data in response to the location of the selected object. In one embodiment, the returned 615 associated data may include a header value, a parameter value or other value copied from the encoded message. In another embodiment, the returned 615 associated data may include a pointer to a location in memory. In one embodiment, a pointer points to a location within the encoded message. In another embodiment, a pointer points to a location within a library.

FIG. 7 is a flow chart of a method 700 for efficient processing of encoded data streams according to one embodiment. Similar to the method 600 of FIG. 6, the method 700 includes the receiving 605, traversing 610, and returning 615 with any of the variations discussed above. However, as discussed below, the method 700 further includes determining 705 whether a current object is a selected object and determining 710 whether there are additional selected objects. Furthermore, the functionality or features discussed in relation to the system 100, client device 106, or method 600 above may be included within the method 700.

The method 700 includes the determination component 208 determining 705 whether an object is a selected object. The determination component 208 may compare an object identified by the iterator component 206 with a list of selected objects. The list of selected objects may include one more objects which, if located, are provided to a client application. For example, the list of selected objects may include objects that may be processed by a client application.

The method 700 also includes determining 710 whether there are additional selected objects. If there are additional objects (Yes at 710) then the method 700 may repeat the traversing 610, determining 705, and returning 615 discussed above. If there are no additional objects (No at 710) the method 700 may end. This may allow the method to end prior to complete traversal of an encoded message. In some situations, when very little information from an encoded message is required by a client program, processing savings can be quite significant.

Some of the infrastructure that can be used with embodiments disclosed herein is already available, such as general-purpose computers, mobile phones, computer programming tools and techniques, digital storage media, and communications networks. A computing device may include a processor such as a microprocessor, microcontroller, logic circuitry, or the like. The processor may include a special purpose processing device such as an ASIC, PAL, PLA, PLD, FPGA, or other customized or programmable device. The computing device may also include a computer-readable storage device such as non-volatile memory, static RAM, dynamic RAM, ROM, CD-ROM, disk, tape, magnetic, optical, flash memory, or other computer-readable storage medium.

Various aspects of certain embodiments may be implemented using hardware, software, firmware, or a combination thereof. A component or module may refer to, be part of, or include an application specific integrated circuit (ASIC), an electronic circuit, a processor, (shared, dedicated, or group) and/or memory (shared, dedicated or group) that execute one or more software or firmware programs, a combinational logic circuit, and/or other suitable components that provide the described functionality. As used herein, a software module or component may include any type of computer instruction or computer executable code located within or on a non-transitory computer-readable storage medium. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a computer-readable storage medium, which together implement the described functionality of the module or component. Indeed, a module or component may comprise a single instruction or many instructions, and may be distributed over several different code segments, among different programs, and across several computer-readable storage media. Some embodiments may be practiced in a distributed computing environment where tasks are performed by a remote processing device linked through a communications network.

The systems and methods disclosed herein are not inherently related to any particular computer or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module or component, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions that, when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a magnetic disk, a punch card, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

What is claimed is:

1. A method for efficient processing of encoded data streams communicated through a wireless network, the method comprising:
   receiving, from the wireless network, at a mobile device, an encoded message comprising a plurality of objects that includes custom objects and library objects, the encoded message encoded according to encoded structures of a wireless session protocol (WSP), wherein the encoded message comprises one or more protocol data units (PDUs) comprising the plurality of objects, the plurality of objects comprising at least a header and a parameter corresponding to the header, wherein at least one of the header and the parameter comprise a compact binary encoding of a library object defined by the WSP in a library;
   storing the encoded message in memory;
   traversing the encoded message in-place using an iterator and within the memory based on the requirements of the WSP, without decoding the encoded message,
      wherein the encoded message remains in an encoded state according to the WSP during traversing,
      wherein traversing the encoded message comprises:
         traversing the plurality of objects within the encoded message using the iterator to locate a selected object of the plurality of objects that is relevant to a particular client application, wherein the iterator utilizes the WSP encoded structures to process objects that are relevant to the client application and skips over objects that are irrelevant, wherein the selected object is selected by the client application, and wherein the selected object in the encoded message comprises the compact binary encoding of the library object that corresponds to the selected object as defined by the WSP; and
         in response to locating the selected object, returning a pointer associated with the selected object to the client application, the pointer indicating a predetermined memory location comprising an un-encoded version of the library object, wherein the predetermined memory location comprises a memory location different than a location of the binary encoding of the library object in the encoded message.

2. The method of claim 1, wherein traversing the plurality of objects within the encoded message comprises locating a subsequent object of the plurality of objects based on structural requirements of the protocol.

3. The method of claim 2, further comprising, in response to locating the subsequent object, returning data associated with the subsequent object to the client application, wherein the returned data comprises a pointer indicating a location of the subsequent object within the encoded message.

4. The method of claim 3, wherein the subsequent object corresponds to a custom object.

5. The method of claim 1, wherein traversing without decoding the encoded message comprises traversing the encoded message without creating an un-encoded version of the encoded message.

6. The method of claim 1, wherein traversing the encoded message comprises zero-copy processing.

7. The method of claim 6, wherein no memory allocation for replicating a portion of the message is required.

8. The method of claim 1, further comprising determining whether an object of the plurality of objects is a selected object.

9. The method of claim 8, wherein determining whether an object of the plurality of objects is a selected object comprises comparing the object with a list of selected objects of the client program.

10. The method of claim 9, wherein the selected object comprises a header and wherein the list of selected objects of the client program comprises one or more selected headers.

11. The method of claim 10, wherein the selected object further comprises a header parameter, the method further comprising returning a pointer corresponding to the header parameter in response to matching the header with at least one of the one or more selected headers, the header parameter corresponding to the header.

12. The method of claim 1, further comprising terminating traversal of the plurality of objects when all selected objects have been located.

13. The method of claim 1, wherein the encoded message comprises a data push message.

14. A system for efficient processing of encoded data streams communicated through a wireless network, the system comprising:
   a receiver component configured to receive at a mobile device, from the wireless network, an encoded message comprising a plurality of objects that includes custom objects and library objects, the encoded message encoded according to the structures of a wireless session protocol (WSP), wherein the encoded message comprises one or more protocol data units (PDUs) comprising the plurality of objects, the plurality of objects comprising at least a header and a parameter corresponding to the header, wherein at least one of the header and the parameter comprise a compact binary encoding of a library object defined by the WSP;
   a memory component configured to store the encoded message in memory;
   an iterator component configured to traverse one or more of the plurality of objects of the encoded message in-place and within the memory based on the requirements of the WSP, without decoding the encoded message, wherein the encoded message remains in an encoded state according to the WSP during traversing, wherein traversing the encoded message comprises traversing the plurality of objects within the encoded message to locate a selected object of the plurality of objects that is relevant to a particular client application, wherein the iterator component utilizes the WSP encoded structures to process objects that are selected by the client application and skips over objects that are not selected by the client application, wherein the selected object is selected by the client application, and wherein the selected object in the encoded message comprises the compact binary encoding of the library object that corresponds to the selected object as defined by the WSP; and a return component configured to return, in response to locating the selected object, a pointer associated with the selected object to the client application, the pointer indicating a predetermined memory location comprising an un-encoded version of the library object, wherein the predetermined memory location comprises a memory location different than a location of the binary encoding of the library object in the encoded message, wherein the receiver component, the memory component, the iterator component, and the return component comprise one or more of circuitry and instructions stored in non-transitory memory.

15. The system of claim 14, wherein traversing the one or more objects within the encoded message comprises locating a subsequent object of the plurality of objects based on structural requirements of the protocol.

16. The system of claim 14, wherein the iterator component is further configured to terminate traversal of the plurality of objects when all selected objects have been located.

17. A non-transitory computer-readable storage medium comprising program code, when executed by a machine, to cause the machine to perform a method for efficient processing of encoded data streams communicated through a wireless network, the method comprising:

receiving, from the wireless network, at a mobile device, an encoded message comprising a plurality of objects that includes custom objects and library objects, the encoded message encoded according to the specific structures of a wireless session protocol (WSP), wherein the encoded message comprises one or more protocol data units (PDUs) comprising the plurality of objects, the plurality of objects comprising at least a header and a parameter corresponding to the header, wherein at least one of the header and the parameter comprise a compact binary encoding of a library object defined by the WSP;

storing the encoded message in memory;

traversing the encoded message in-place using an iterator and within the memory based on the requirements of the WSP, without decoding the encoded message, wherein the encoded message remains in an encoded state according to the WSP during traversing, wherein traversing the encoded message comprises traversing the plurality of objects within the encoded message using the iterator to locate a selected object of the plurality of objects that is relevant to a particular client application, wherein the iterator utilizes the WSP encoded structures to process objects that are identified by the client application and skips over objects that are not identified by the client application, wherein the selected object is selected by the client application, and wherein the selected object in the encoded message comprises the compact binary encoding of the library object that corresponds to the selected object as defined by the WSP; and in response to locating the selected object, returning a pointer associated with the selected object to the client application, the pointer indicating a predetermined memory location comprising an un-encoded version of the library object, wherein the predetermined memory location comprises a memory location different than a location of the binary encoding of the library object in the encoded message.

18. The computer-readable storage medium of claim 17, wherein traversing the plurality of objects within the encoded message comprises locating a subsequent object of the plurality of objects based on structural requirements of the protocol.

19. The computer-readable storage medium of claim 17, wherein the iterator component is further configured to terminate traversal of the plurality of objects when all selected objects have been located.

* * * * *